Nov. 12, 1963  D. J. HOWE ETAL  3,110,594
CONTINUOUS PRESCREENING OF FILM
Filed Nov. 14, 1960
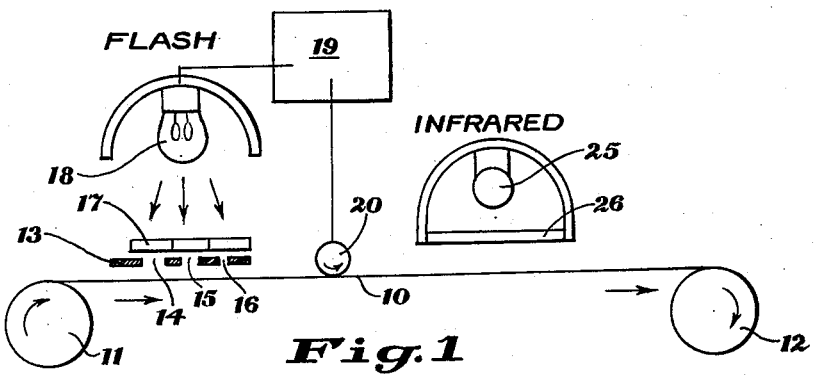
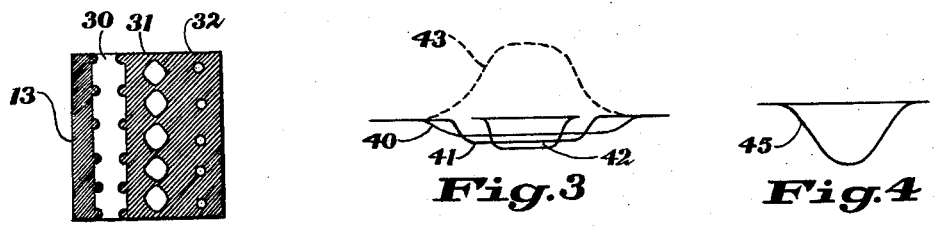
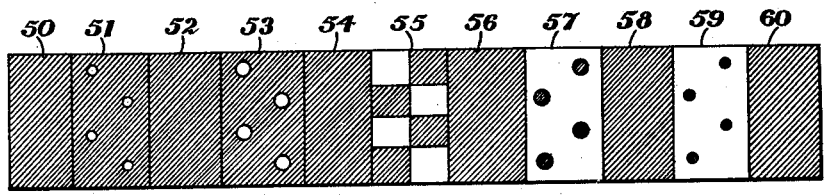
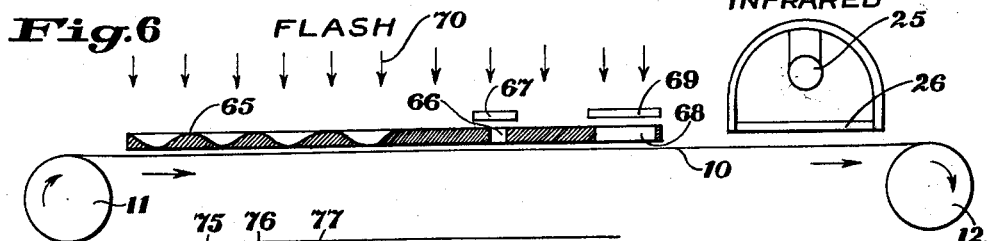
Donald J. Howe
Richard E. Maurer
INVENTORS
ATTORNEYS

United States Patent Office 3,110,594
Patented Nov. 12, 1963

3,110,594
CONTINUOUS PRESCREENING OF FILM
Donald J. Howe and Richard E. Maurer, Rochester, N.Y., assignors to Eastman Kodak Company, Rochester, N.Y., a corporation of New Jersey
Filed Nov. 14, 1960, Ser. No. 69,154
4 Claims. (Cl. 96—45)

This invention relates to prescreened film, i.e. film which has variations in sensitivity distributed in a halftone pattern. It relates specifically to continuous prescreening of film.

Clayden prescreened film is described in U.S. Patent 2,691,586 to J. A. C. Yule and R. E. Maurer. The cofiled application Serial No. 69,153 by Donald J. Howe describes an improved method of Clayden prescreening film involving an infrared exposure of the Clayden exposed film to remove by the Herschel effect any surface latent image or sensitization which accompanies the desensitization.

The present invention involves a series of Clayden prescreening exposures with different intensity distribution in the elements of the halftone pattern. That is, one Clayden exposure may be extremely intense at the center of the dot and another exposure may be uniformly intense over a relatively large area of the dot but zero at the corner of each dot or the Clayden exposures may be distributed in an undulating pattern so that there is a gradual variation in intensity from the corner to the center of each dot. Utilizing the Herschel clean-up of surface latent image after the succession of Clayden exposures have been given through the various screens, the full benefit of each of the Clayden exposures is realized. This principle is applied, according to the present invention, to continuous prescreening. The film is moved past a succession of exposure stations in some of which it receives a halftone Clayden desensitizing exposure and at the last one or more of which it receives an infrared Herschel exposure. The film may be stopped during the exposure at each station or the film may move continuously, but relatively slowly, so that there is no appreciable motion during the Clayden flash exposures which in this case are synchronized to register on the same areas of the film as it passes the successive stations. Continuous motion through the infrared exposing station is quite acceptable, since the infrared does not expose the film but merely removes surface latent image.

In comparison with U.S. Patent 2,925,339, Maurer, which also provides a system for continuous Clayden prescreening, the present invention eliminates the need for careful interleaving of exposures and at the same time provides precise tone control, i.e. control of the distribution of sensitivity in each dot. Thus the Herschel clean-up effect greatly simplifies continuous Clayden prescreening of film.

The invention and its advantages will be more fully understood from the following description when read in connection with the accompanying drawing, in which:

FIG. 1 schematically illustrates a prescreening process according to a preferred embodiment of the invention.

FIG. 2 is a plan view of the halftone screen used in FIG. 1.

FIGS. 3 and 4 are graphs illustrating the magnitude of the prescreening phenomena.

FIG. 5 shows an alternative form of the screen which may be used in the process illustrated in FIG. 1.

FIG. 6 illustrates an alternative embodiment of the invention.

FIG. 7 graphically illustrates the desensitizing effect of the Clayden exposures utilized in FIG. 6.

In FIG. 1 a Clayden sensitive high contrast film 10 is moved continuously from a supply roll 11 to a take up roll 12. It passes a sharp tint or halftone screen 13 at halftone separation therefrom, i.e. at the separation whereat diffraction produces the well known distribution of intensity. Alternatively, the tint 13 may be in contact or effective contact with the film 10, to give precise control of dot shape (e.g. posterizing distribution). The screen 13 consists of rows of halftone apertures, the successive rows differing in size but each row being a uniform tint. The apertures 14, 15 and 16 are successively smaller and neutral density films 17 are placed in alignment with each row of apertures to provide the desired intensity at each aperture size. In the specific example shown a density of 1.0 is aligned with aperture 14; a density of 0.5 with aperture 15 and a density of zero or 0.1 with aperture 16, the apertures 14, 15 and 16 corresponding respectively to 90%, 50% and 10% tints. Thus the corners (10%) receive all three exposures. The exposures are all of the same brief duration, the 10% dot exposure being about 3 times that of the 50% dot exposure and about 10 times that of the 90% dot exposure. A flash lamp 18 operated by a control circuit 19 exposes the film simultaneously through apertures 14, 15 and 16. The film is moved at such a speed that the exposures register. That is, the area which is exposed through aperture 14 during one flash is exposed through the aperture 15 by the following flash and then through the aperture 16, in turn. A satisfactory flash of .001 second is given by a Heiland Strobonar lamp at a distance of 5 feet; this provides 50 watt seconds' flash. The flashes are synchronized with the motion of the film by a rotary switch 20 engaging the edge of the film. Alternatively the film could be stopped for each exposure and registered precisely. After the film has received all three Clayden exposures, it is passed under an infrared source consisting of a lamp 25 and an infrared filter 26. The infrared exposure removes the surface latent image inherent in the successive Clayden exposures and allows the Clayden effects to add up.

As shown in FIG. 2 the apertures 14, 15 and 16 of FIG. 1 are actually the openings in halftone tints 30, 31 and 32 respectively. Considering a single element or dot of the halftone pattern, the exposures through apertures 14, 15 and 16 each cause a desensitization in the dot whose distribution is represented respectively by curves 40, 41 and 42. However, these Clayden exposures are accompanied by a fogging or sensitizing of the film, the total of this adverse effect being represented by a broken line 43. The adverse effect would perhaps mask out entirely the effect of Clayden prescreening. After the Herschel clean-up of the surface latent image, however, the latent density or sensitization represented by curve 43 disappears and the desensitizations represented by the curves 40, 41 and 42 add up to give a high total desensitization as represented by the curve 45 in FIG. 4.

FIG. 5 illustrates a somewhat more practical (i.e. easier to construct) arrangement in which the tints are separated rather than being located at successive stations. In the arrangement shown the tints are at alternate stations and only one dark station occurs between successive tints, but any number of dark stations may be included between the exposure stations. The stations are numbered 50 to 60 and the even numbered ones are dark stations. A flash is given each time the film moves from one station to the next, but the film receives exposure only for every other flash since the areas of the film behind the dark stations receive no exposure. In each of the tints, represented by the odd numbered stations, there are two rows of dots offset so that the principal halftone pattern is at 45° to the direction of motion of the film. The light areas surrounding the black dots in tints 57 and 59 could be shifted with respect to the black dot. For example in FIG. 5 the tint 57 has two dots in the left hand row and two dots in the right hand row. The rectangle around each dot in the left hand row could be shifted so as to extend into the dark station 56 or the light areas accompanying the black dots in the right hand row could be shifted to extend into the dark station 58. It does not matter when the various exposures are given to each area of each dot, provided they receive the total number of exposures and each of them is sufficiently brief to give Clayden effect. The arrangement shown in FIG. 5 is the preferred one and is the one illustrated since it is the easiest to understand.

In FIG. 6 the film 10 passes effectively in contact with a contact screen 65 and the flash exposure 70 is synchronized to register on the film 10 behind successive dots of the contact screen 65 gradually building up the Clayden desensitization as illustrated in FIG. 7 by curves 75, 76, 77 and 78. After the four graded exposures, the film moves effectively in contact with a tint whose aperture is shown at 66 so that the flash exposure through a neutral density filter 67 produces a sharp corner 79 on the prescreening pattern. The curves shown in FIG. 7 ignore the objectionable latent image or sensitization since such adverse aspects are going to be wiped out eventually by the Herschel exposure by the lamp 25 and infrared filter 26. The film 10 following exposure through tint 66, or in some later stage, moves essentially into contact with a very large aperture tint 68. Exposure through a fairly high density neutral filter 69 further desensitizes all of the dot as illustrated by the curve 80. That is the curves 78 and 79 is shifted downward a substantially uniform amount to the location indicated at 80 and 81. This leaves a small area in the center of the dot with substantially no desensitization. After the infrared cleanup of surface latent image, the desensitization is substantially that shown by the curve made up of parts 82, 83 and 84. This has a center area 84 of substantially no desensitization so that the sensitivity drops rapidly at the edge of this center area to the curve 82 and then proceeds gradually to the corner of the dot where it again drops suddenly to form a highly desensitized corner 83. As is known, it is desirable in various reproduction processes to have relatively "persistent" centers and corners of the halftone dots and this is provided by the shape of the prescreening desensitization curve. Thus the present invention not only provides continuous prescreening by a relatively simple method, but also allows precise control of the reproduction curve, by controlling the distribution of desensitization within each dot to match any desired curve.

Having thus described various embodiments of our invention, we point out that it is not limited thereto but is of the scope of the appended claims.

We claim:
1. The method of prescreening a silver halide emulsion layer comprising Clayden exposing it to a series of brief registered uniform halftone exposures differing from one another in the distribution of intensity in the elements of the halftone and having the centers of the elements in the same locations relative to the layer and uniformly exposing it to infrared sufficiently to substantially remove surface latent image caused by the Clayden exposures.

2. The method according to claim 1 in which the succession of Clayden exposures include at least three of the same brief duration, differing from one another in dot areas and intensity, the larger areas having the lower intensity.

3. The method according to claim 1 in which the succession of Clayden exposures are of the same brief duration and include one generally covering over 90% of each dot, one covering about half of each dot and one generally confined to the dot corners covering about 10% of each dot, the intensity of the 10% exposure being about 3 times that of the half dot exposure and about 10 times that of the over 90% dot exposure.

4. The method of substantially continuously prescreening a silver halide emulsion layer comprising moving the layer through a series of exposure stations, Clayden exposing the layer at a plurality of stations through halftone screens of similar fineness but different distribution of density in the elements, the same areas of the layer being registered with the successive screen and, at least after the last screen exposure, exposing the layer uniformly to infrared sufficiently to substantially remove surface latent image caused by the Clayden exposures.

References Cited in the file of this patent

UNITED STATES PATENTS

| | | |
|---|---|---|
| 1,575,408 | Bassini | Mar. 2, 1926 |
| 2,343,586 | Schuffan | Mar. 7, 1944 |
| 2,912,326 | Maurer | Nov. 10, 1959 |
| 2,925,339 | Maurer | Feb. 16, 1960 |
| 2,987,397 | Maurer | June 6, 1961 |